United States Patent
O'Connor et al.

(10) Patent No.: US 11,989,542 B2
(45) Date of Patent: May 21, 2024

(54) ENHANCING OPERATOR INSTALLATION AND UPGRADE MANAGEMENT AND VERIFICATION

(71) Applicant: Red Hat, Inc., Raleigh, NC (US)

(72) Inventors: Cathal O'Connor, Waterford (IE); Brian Gallagher, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/518,902

(22) Filed: Nov. 4, 2021

(65) Prior Publication Data

US 2023/0133312 A1 May 4, 2023

(51) Int. Cl.
*G06F 9/44* (2018.01)
*G06F 8/61* (2018.01)
*G06F 9/445* (2018.01)
*G06F 9/455* (2018.01)
*G06F 9/50* (2006.01)

(52) U.S. Cl.
CPC .............. *G06F 8/61* (2013.01); *G06F 9/5027* (2013.01)

(58) Field of Classification Search
CPC ................................. G06F 8/61; G06F 9/5027
See application file for complete search history.

(56) References Cited

U.S. PATENT DOCUMENTS

| 9,785,772 | B1 * | 10/2017 | Johansson | G06F 21/56 |
|---|---|---|---|---|
| 10,503,623 | B2 * | 12/2019 | Keller | G06F 9/45558 |
| 11,204,749 | B2 * | 12/2021 | DuBois | G06F 8/61 |
| 11,269,613 | B2 * | 3/2022 | Fakhouri | G06F 9/54 |
| 11,469,944 | B1 * | 10/2022 | Lindholm | H04L 41/0897 |
| 2012/0203705 | A1 * | 8/2012 | Van Beneden | G06Q 10/10 705/317 |
| 2016/0124741 | A1 * | 5/2016 | Hu | H04L 67/34 717/171 |
| 2016/0283219 | A1 * | 9/2016 | Banford | G06F 8/65 |

(Continued)

FOREIGN PATENT DOCUMENTS

| CA | 2862080 C * | 8/2020 | G06F 3/0482 |
|---|---|---|---|
| CN | 103995709 | 8/2014 | |

(Continued)

OTHER PUBLICATIONS

Raffaele Spazzoli, Kubernetes Operators Best Practices, 2019, pp. 1-13. https://cloud.redhat.com/blog/kubernetes-operators-best-practices (Year: 2019).*

(Continued)

*Primary Examiner* — Mongbao Nguyen
(74) *Attorney, Agent, or Firm* — Womble Bond Dickinson (US) LLP

(57) ABSTRACT

Processing logic may obtain a resource of a platform for a containerized application. The platform may include custom resources, and an operator that manages the custom resources during runtime of the containerized application. In response to an indication being defined in the resource, processing logic may schedule an upgrade to a new operator. Processing logic may perform one or more pre-installation actions or post-installation actions that are defined in the resource to manage the installation of the new operator in a controlled manner and reduce the risk of incompatibilities between the new operator and the custom resources.

20 Claims, 7 Drawing Sheets

(56) References Cited

U.S. PATENT DOCUMENTS

| | | | |
|---|---|---|---|
| 2018/0173517 A1* | 6/2018 | Shantharam | H04W 4/08 |
| 2019/0220285 A1* | 7/2019 | Ali | G06F 9/4401 |
| 2019/0227786 A1* | 7/2019 | Price | G06F 8/65 |
| 2020/0278857 A1 | 9/2020 | Fakhouri et al. | |
| 2020/0334027 A1* | 10/2020 | Kalaskar | G06F 8/65 |
| 2020/0356354 A1* | 11/2020 | Mitra | G06F 16/903 |
| 2021/0226861 A1* | 7/2021 | Barsalou | G06F 3/0482 |
| 2022/0012045 A1* | 1/2022 | Rudraraju | G06Q 30/02 |
| 2022/0158926 A1* | 5/2022 | Wennerström | H04W 24/06 |
| 2022/0229687 A1* | 7/2022 | Singhal | G06F 9/45558 |
| 2022/0300340 A1* | 9/2022 | Cardenas | G06F 9/505 |
| 2022/0374284 A1* | 11/2022 | Kirmse | G06F 9/5072 |
| 2023/0125754 A1* | 4/2023 | Willett | G06Q 10/103 |
| | | | 717/102 |
| 2023/0131898 A1* | 4/2023 | Willett | G06F 3/0482 |
| | | | 707/803 |

FOREIGN PATENT DOCUMENTS

| | | | | |
|---|---|---|---|---|
| CN | 112214330 A * | 1/2021 | | |
| CN | 112269640 | 1/2021 | | |
| CN | 112905306 | 6/2021 | | |
| CN | 112925609 | 6/2021 | | |
| CN | 112925609 A * | 6/2021 | | G06F 8/65 |
| JP | 2011203917 A * | 10/2011 | | G06F 8/65 |
| WO | WO-2021150306 A1 * | 7/2021 | | G06F 11/0757 |
| WO | WO-2021150307 A1 * | 7/2021 | | G06F 11/0757 |

OTHER PUBLICATIONS

Jeesmon Jacob, Steps to install an operator from command line in OpenShift, pp. 1-2, Sep. 2021. https://medium.com/@jeesmon/steps-to-install-an-operator-from-command-line-in-openshift-9473039bc92e (Year: 2021).*

Sunish Surendran, Deploying Kubernetes Operators using Operator Life Cycle Manager, Mar. 2021, pages https://dev.to/sunishsurendrank/installing-kubernetes-operators-using-operator-life-cycle-manager-3i6d (Year: 2021).*

Lily Puspa Dewi, Server Scalability Using Kubernetes, 2019, pp. 1-4. https://ieeexplore.ieee.org/document/9024501 (Year: 2019).*

Bob Aiello, Draft Standard for DevOps: Building Reliable and Secure Systems Including Application Build, Package and Deployment, 2020, pp. 11-93. https://ieeexplore.ieee.org/document/9353440?source=IQplus (Year: 2020).*

Luciano Baresi, COCOS: a Scalable Architecture for Containerized Heterogeneous Systems, 2020, pp. 103-112. https://ieeexplore.ieee.org/stamp/stamp.jsp?tp=&arnumber=9101324 (Year: 2020).*

Red Hat, Inc., "Installing and configuring the OpenShift Update Service," OpenShift Container Platform 4.6, <https://docs.openshift.com/container-platform/4.6/updating/installing-update-service.html>, 2021, 22 pages.

Red Hat, Inc., "Upgrading installed Operators," OpenShift Container Platform 4.6, <https://docs.openshift.com/container-platform/4.6/operators/admin/olm-upgrading-operators.html>, 2021, 3 pages.

Red Hat, Inc., "Operator Lifecycle Manager concepts," <https://docs.openshift.com/container-platform/4.7/operators/understanding/olm/olm-understanding-olm.html>, 2021, 6 pages.

* cited by examiner

ENHANCING OPERATOR INSTALLATION AND UPGRADE MANAGEMENT AND VERIFICATION

TECHNICAL FIELD

Aspects of the present disclosure relate to containerized applications, and more particularly, to installation and upgrading of Operators on a platform that supports containerized applications.

BACKGROUND

Data can be stored on servers which can be cloud-based and/or reside in a local network. Applications are run on servers to manage the data for a variety of computing needs. A monolithic software architecture is characterized by software that is built and run as a single application. Such a solution can include a client-side user interface, a server side-application, a database, or combinations thereof.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
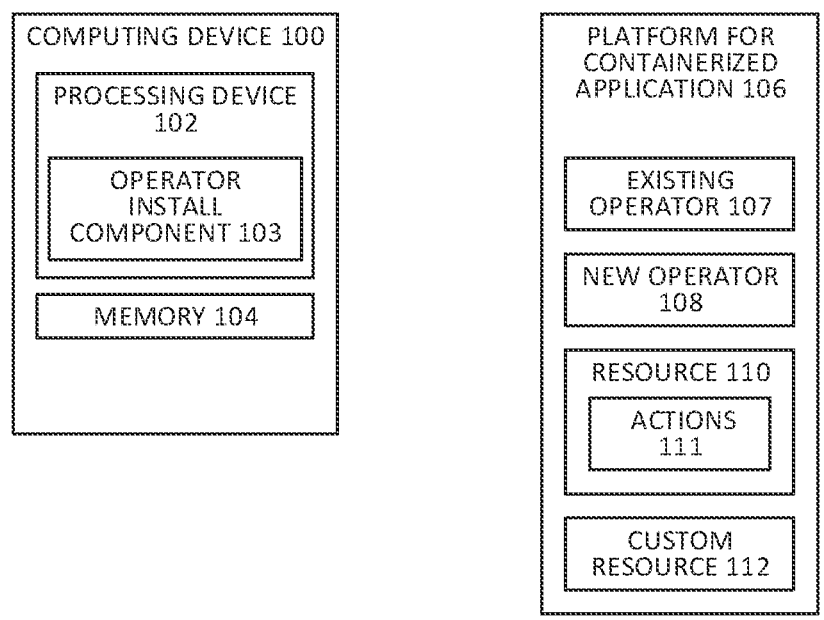
FIG. 1 shows a block diagram of a computing device that performs pre-installation actions in preparation for installing an Operator, in accordance with some embodiments.

Application functionality with monolithic software architecture is unified and managed and served from a single application base. Monolithic applications lack modularity—they have a single large code base and cannot be operated on or upgraded in a modular fashion.

Virtual machines (VMs) allow internet providers to run multiple operating system instances on a common server. With VMs, applications can be isolated from each other in the same server, thus reducing the need for buying or maintaining multiple servers. VMs, however, can consume system resources because they make virtual copies of resources such as operating systems, etc. For servers to run VMs, a substantial amount of RAM, clock time, and operating system licenses may be required.

Containers, also referred to herein as containerized environments, support virtualization of multiple applications, during runtime, while using a common OS instance. A single container can have dedicated resources such as its own file system, RAM, CPU, storage, and access to specified system resources. Containers can include packages of application-specific software that include everything that it needs to run, including code, dependencies, libraries, binaries, and more. Compared to VMs, containers can share a single operating system kernel instead of having a full copy of an OS kernel per instance of VM. As such, containers can take up less resources and be more portable than a traditional VM architecture.

With a microservices architecture, an application can comprise individual services (e.g., microservices) that communicate with each other through one or more APIs (e.g., REST, WebHooks, etc.). Microservices offer a different approach to application development and deployment, and is suited to the agility, scale, and reliability requirements of modern cloud applications. Such an architecture emphasizes that each of the individual services of the application are small enough to reflect independent concerns and functionality, so that each service implements a single function. Microservices can share business dependencies and communicate with each other such that they perform operations in a synchronized manner. Combined, they may form an application that may appear, to a user, to behave like a monolithic application. Microservices can be grouped in a container where the microservices in the container can use those dedicated resources of the container.

Platforms for containerized applications help to manage containerized workloads and services. Such platforms, such as, for example, Kubernetes™, may facilitate both declarative configuration and automation. A platform can include a set of building blocks ("primitives"), which collectively provide mechanisms that deploy, maintain, and scale applications based on CPU, memory, or custom metrics. Such a platform can be extensible to meet different workloads. For example, the platform can include an application programming interface (API), that may be used by internal components as well as extensions and containers that run on the platform. The platform may control compute and storage resources by defining resources as Objects, which can then be managed as such.

A resource of a platform can be understood as an endpoint in the platform's API that stores a collection of API objects of a certain kind. A platform may include one or more resources by default as part of any installation of the platform. These default resources may include a built-in pods resource that may contain a collection of pod objects. Another default resource may be a 'Root' resource. The platform may also include one or more custom resources. A custom resource can be understood as an extension of the platform's API that is not available in the platform by default. A custom resource or custom resources represents a customization of a particular installation of the platform. A custom resource can include a custom resource definition that can include metadata of the custom resource. This custom resource definition can define how the custom resource should behave or one or more desired states of the custom resource.

A custom resource allows storage and retrieval of structured data. A custom resource can have a custom controller, built into an Operator, that allows a user to declare or specify the desired state of the custom resource in the custom resource definition. The custom controller can act to try keep the current state of objects such as a custom resource in sync with the desired state. The controller can interpret the structured data as a record of the user's desired state, and continually maintains this state. Custom resources can be created and defined by a custom resource definition.

Operators are customizable software extensions to the platform that make use of custom resources to manage applications and their components. Operators can include a custom controller which performs a control loop. The Operator may serve to automatically manage a service or set of services without human input. The Operator can functionality that enforces how the service or set of services ought to behave, how to deploy it, and how to react if there are problems. The Operator may be customized to extend a cluster's behavior without modifying the underlying code of the platform. Operators can be clients of the platform's API that act as controllers for a custom resource. An operator can have a control loop that repeatedly polls each custom resource to determine a current state and acts to move that custom resource towards a desired state (which can be defined in the custom resource definition), in what can be understood as 'reconciliation'. Reconciliation can also be understood more broadly as keeping an object (e.g., a custom resource) of the platform in synchronization with the underlying API of the platform. In addition to reconciliation, an operator can also be configured to deploy an application on demand, take and restore backups of that application's state, handle upgrades of the application code alongside related changes such as database schemas or extra configuration settings, simulate failure in all or part of a cluster to test its resilience, or other operator In conventional systems, an operator lifecycle manager (OLM) may perform upgrades of an operator of a platform for containerized applications. The OLM may replace an existing operator with a new operator. A new pod can spin up, thereby signaling that the new operator has been successfully installed. Whether the upgrade is indeed successful, however, can depend on more than the new pod being operative. For example, a strong relationship exists between the operator and the custom resources that the operator manages. An operator may have built into it, functionality that is specific to those custom resources. Thus, for an operator upgrade to be successful, the custom resources may need to be in a particular state. Conventional systems do not verify for such compatibility, nor do conventional systems consider other compatibility issues that may exist between the new operator and the custom resources of the containerized application. As such, conventional systems do not have domain-specific verification of operator installation and upgrades. A window of risk materializes during an operator upgrade. If a controller runs into a bad state of a custom resource during this time, this state may not be reconciled properly by the new operator. Thus, under conventional systems, operator upgrades may result in failed upgrades and downtime of the containerized application.

Further, site reliability engineering (SRE) may run a set of ad hoc commands prior to or after upgrade of an operator, however, such a process may vary from one instance to another, thus lacking in governance and auditability. Further, such an approach requires human decision making, which may scale poorly when dealing with a fleet of clusters. Further, scheduling of an operator upgrade can present additional challenges. An install plan can be manually or automatically approved, thereby triggering an immediate installation of an operator. A customer, however, may want to upgrade an operator at a specific time and date to minimize impact to the application. Finally, given that current systems may not have the capability to rollback operators to previous versions, the consequences of failing to install the new operator, or installing an incompatible operator, could be that the application no longer has a working operator. As such, there is a need to mitigate and reduce such risk.

Aspects of the disclosure address the above-noted problems and other deficiencies by providing a framework that works to automate and provide a controlled environment for operator installation. Processing logic may perform pre-operative actions and post-operative actions in an automated manner that verify and enforce compatibility between a new operator and the custom resources of the platform. The processing logic may be integrated with or installed as part of the platform. For example, processing logic can be integrated as part of an operator, the OLM, or other component (e.g., a sidecar container) of the platform.

In one example, processing logic may obtain a resource of a platform for a containerized application. In response to an indication being defined in the resource, processing logic can schedule an installation of a new operator of the platform to replace an existing operator that manages one or more custom resources of the platform. Processing logic can perform one or more pre-installation actions that are defined in the resource, prior to the installation. Processing logic can approve the installation of the new operator in response to successful execution of the one or more pre-installation actions.

FIG. 1 shows a block diagram of a computing device that performs pre-installation actions in preparation for installing an operator, in accordance with some embodiments.

Computing device 100 includes a processing device 102 and a memory 104. Memory 104 may include volatile memory devices (e.g., random access memory (RAM)), non-volatile memory devices (e.g., flash memory) and/or other types of memory devices.

Processing device 102 includes an operator install component 103. Operator install component 103 may obtain a resource 110 of a platform for a containerized application 106. A containerized application can refer to an application that has one or more microservices that work together to perform business logic (e.g., application specific functionality), where the microservices share resources (e.g., CPU, memory, services, etc.) of a container. Platform 106 may manage containerized workloads and services. For example, platform 106 may manage various containers, each with their own resources, and microservices.

The operator install component 103 can scan resource 110, which can, in some embodiments be a custom resource 112. The resource can be a special resource type, which can be referred to herein as an install management verification (IMV) resource. In some aspects, the resource 110 can be file with a given format such as a XML file, a JSON file, a YAML file, or other format.

Resource 110 can include an ordered list of pre-installation and/or post-installation actions. The actions can be grouped into 'tasks' and 'verifications'. A task can be understood as an operation that is to be performed by the operator that does not collect status. A verification can be understood as an operation that collects a status from a custom resource, a pod, or other component, and verifies whether the value of the status satisfies one or more criterion. In some embodiments, the resource 110 can reside in a manifests directory along with a cluster service version (CSV) and a custom resource definition (CRD). As such, the resource 110 can be directly associated with a particular version of the Operator. The resource 110 can be automatically acted upon by the operator install component 103 to perform actions as defined in the resource.

For example, the resource may include a field that indicates to the operator install component to install a new operator, or to schedule installation of a new operator. In response to an indication being defined in the resource, the operator install component 103 can install of a new operator 108 to the platform to replace an existing operator 107 of the platform that manages one or more custom resources 112 of the platform.

As described, the existing operator 107 may manage the custom resources 112 of the platform, via a control loop. In an operator's control loop, the operator can repeatedly poll a state of each of custom resource 112. Each custom resource can return a current state of the custom resource. The operator can reference this current state of the custom resource against a desired state of the custom resource (which may be defined in a custom resource definition), and take appropriate action to try to get the custom resource to reach the desired state.

The operator install component 103 can perform one or more actions 111 that are defined in the resource 110. Actions 111 can include pre-installation actions that are to be performed prior to the installation. These pre-installation actions may reduce the risk of incompatibilities that may exist between the new operator 108 and the custom resources 112. Additionally, or alternatively, the actions 111 can include post-installation actions that are performed by the operator install component 103 after initiation of the installation of the new operator.

Pre-installation actions may verify that some or all of the one or more custom resources are in a desired pre-defined state (e.g., a desired version number). This pre-defined state can be defined in the resource 110.

In some examples, the one or more pre-installation actions include pausing reconciliation of the existing operator 107. For example, the operator install component 103 may verify that a current state of a custom resource 112 satisfies the desired state, and then pause the existing operator 107 from performing further reconciliation. As such, the state of the custom resource may be in a known and desired state to perform installation of the new operator.

The operator install component 103 may approve the installation of the new operator in response to successful execution of the one or more pre-installation actions. In some examples, approving the installation of the new operator is performed by the operator in stall component in response to successful execution of some or all of the one or more pre-installation actions. The operator install component may not approve the installation of the new operator if one or more of the pre-installation actions fail.

Each of the actions 111 can have an associated 'time out' such that if the action does not complete within a time limit, the action can return a failed result. Additionally, or alternatively, some of the actions, (e.g., a 'verification' action) can reference one or more conditions against a desired condition. If the desired condition and the current condition do not match, the action can also return a failed result.

In some examples, the operator install component 103 approves the installation of the new operator by approving an install plan that an Operator Lifecycle Manager (OLM) monitors. The OLM see that an install plan has been approved and can respond to the install plan by removing the existing operator 107 and installing the new operator 108. The installation of the new operator 107 may not be performed unless the install plan is approved.

As described, the new operator 108 and the existing operator 107 may each has its own respective control loop. During runtime of the containerized application, the control loop of the operator that is installed can repeatedly obtain a current state from each of one or more custom resources of the platform. The control loop may perform actions to move each of the one or more custom resources 112 to a desired state in what can be referred to as reconciliation. For example, an operator can allocate memory, CPU, perform a database operation, or otherwise act to move a custom resource towards a desired state. As such, prior to installation, the existing operator may run its control loop to reconcile the custom resources 112. After installation, the new operator 108 takes the role of the existing operator 107 and runs its own control loop to reconcile each of the custom resources 112.

Figure 2:
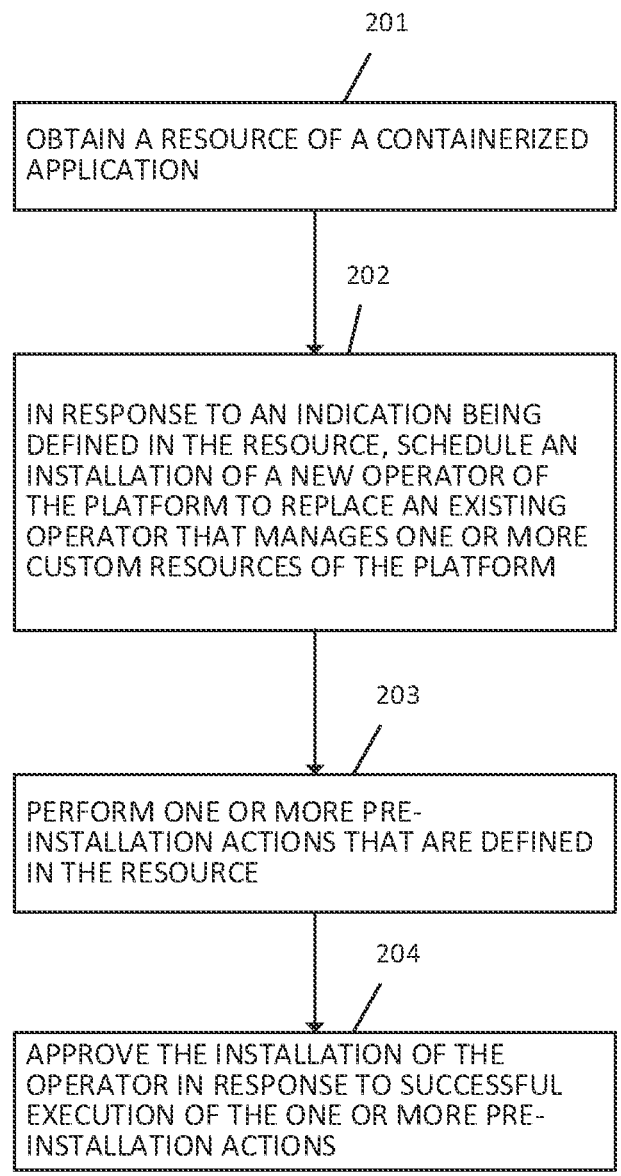
FIG. 2 shows an example method for installation management of an Operator on a platform for a containerized application, in accordance with some embodiments.

FIG. 2 shows an example method for installation management of an operator on a platform for a containerized application, in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 2, method 200 illustrates example functions used by various embodiments. Although specific function blocks ("blocks") are disclosed in method 200, such blocks are examples. That is, embodiments are well suited to performing various other blocks or variations of the blocks recited in method 200. It is appreciated that the blocks in method 200 may be performed in an order different than presented, and that not all of the blocks in method 200 may be performed.

Figure 5:
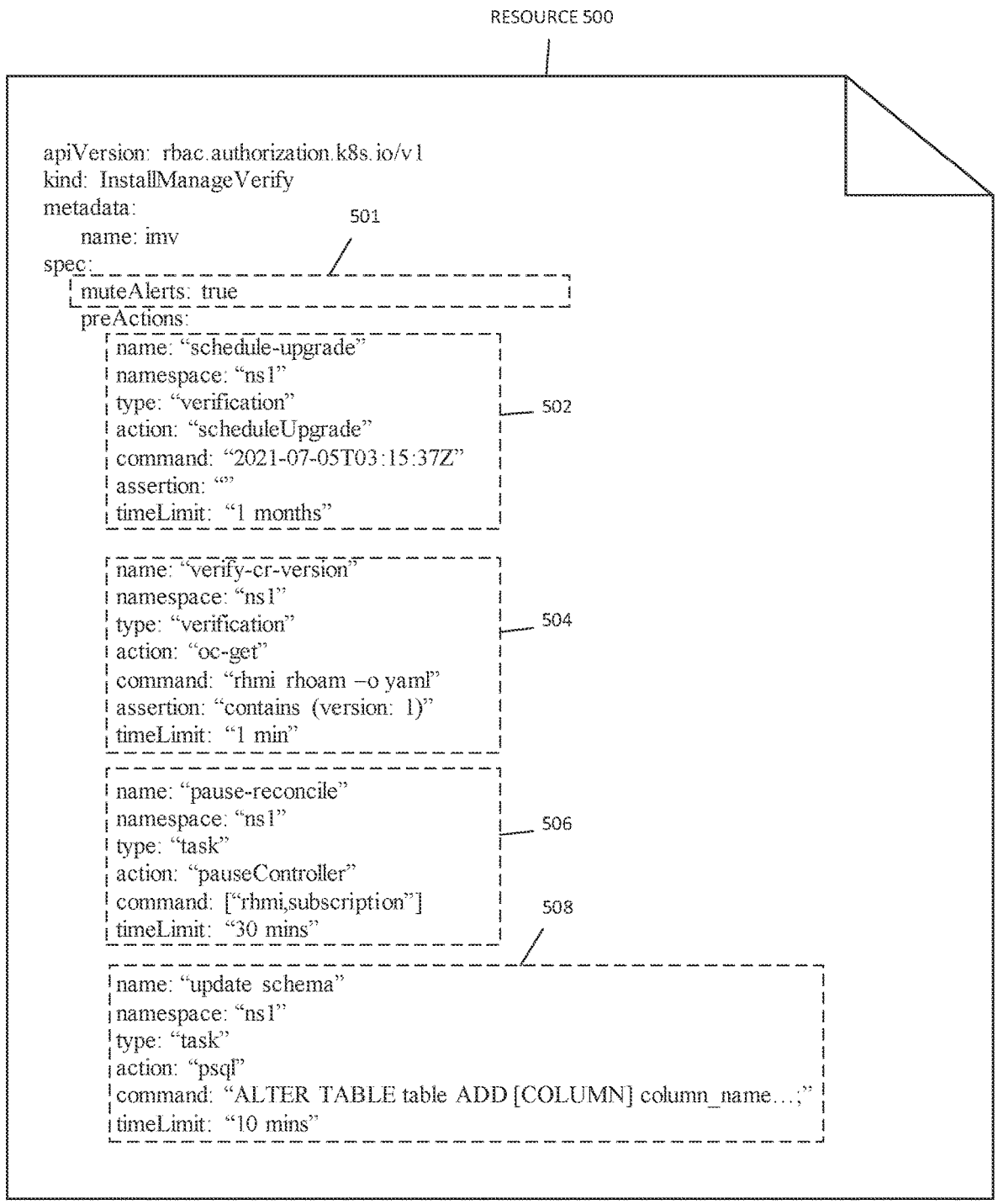
FIG. 5 shows an example resource having instructions for pre-installation actions, in accordance with some embodiments.

At block 201, processing logic can obtain a resource of a platform for a containerized application. The resource can include instructions and other information used by processing logic to prepare the platform for the installation. Examples of such a resource are shown in FIG. 5 and in FIG. 6 as discussed in other sections.

At block 202, in response to an indication (e.g., a flag or command) being defined in the resource, processing logic can schedule an installation of a new operator of the platform to replace an existing operator that manages one or more custom resources of the platform. For example, the resource may include an action such as 'scheduleUpgrade'. Processing logic may parse the resource to find this action, and respond by scheduling an installation of the new operator to the platform. In some examples, processing logic can write a date or time to a subscription of the platform and then monitor this subscription until the current date or time is that of the written date or time. Processing logic can begin performance of one or more pre-installation actions at that date or time.

At block 203, processing logic can perform one or more pre-installation actions that are defined in the resource, prior to the installation of the new operator. In some examples, these pre-installation actions can include verifying a state of a custom resource against a pre-defined state. For example, processing logic may poll a custom resource to determine if the current version of the custom resource matches a desired version number.

At block 204, processing logic can approve the installation of the new operator in response to successful execution of the one or more pre-installation actions. As described, this can include approving an installation plan that triggers action by an OLM.

Figure 3:
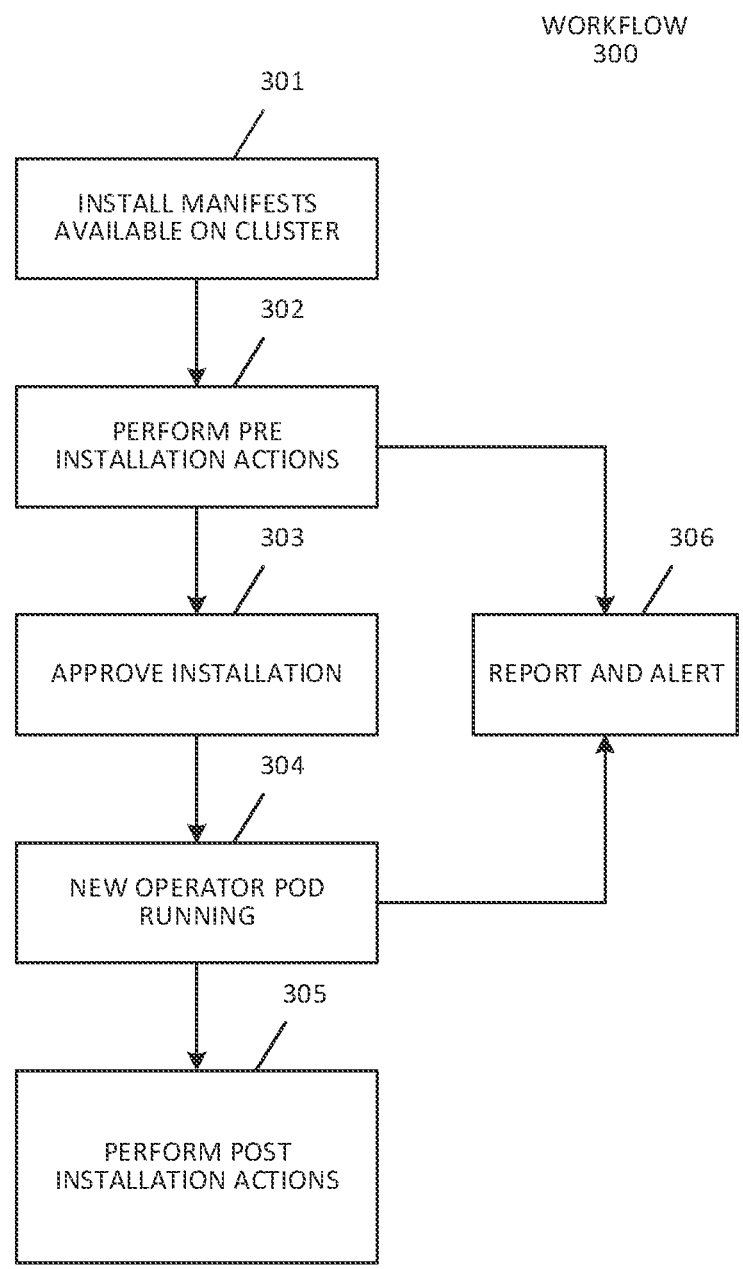
FIG. 3 shows an example workflow for installation management of an Operator on a platform for a containerized application, in accordance with some embodiments.

FIG. 3 shows an example workflow 300 for installation management of an Operator on a platform for a containerized application, in accordance with some embodiments.

At block 301, processing logic can install manifests that are available on a cluster. This can include installing a resource that contains actions and an indication to install a new operator. In some aspects, the processing device may mute alerts prior to approving installation of the operator and/or prior to performing pre-installation operations. Muting can be performed by a flag or other setting that can be indicated as 'on' or 'off' in the resource. Muting alerts may be beneficial when the operator upgrade can potentially affect performance of the application (e.g., if the operator upgrade causes a slowing or momentary downtime of the application). This can prevent the SRE from unnecessarily reacting to a cluster alert.

At block 302, processing logic can perform pre-installation actions, as described in other sections. In some examples, if a pre-installation action fails, then processing logic can proceed to block 306 and send a report or alert to one or more users (for example, in the form of an email or notification in an application). The report can include details such as, for example, a failed verification, a timeout, or other failure.

At block 303, processing logic can approve installation of the new operator. This can be performed conditionally. For example, processing logic may not approve the installation of the new operator unless the pre-installation actions are performed successfully. An action can be deemed as successful if it verifies a desired state of a custom resource and/or if the action completes prior to a time limit.

At block 304, the new operator pod may spin up and become active. For example, the OLM can install the new operator in response to an approval at block 303. Pods can be understood as the smallest deployable units of computing that are managed on a platform for containerized applications. A pod may include one or more containers, with shared storage and network resources, and rules for how those containers are run by the platform. A pod's contents may be co-located and co-scheduled, and run in a shared context. A pod can serve as a wrapper for one or more containers. Processing logic can perform a post-installation action at block 304 to verify that the installation of the new operator is in progress, for example, by obtaining status of the new operator pod to see if it is running. If not, or if a time limit runs out, processing logic can proceed again to block 306 to send a report or alert.

At block 305, processing logic can perform post installation actions, to verify that the installation of the new operator is successful. In some examples, post installation actions can include verifying that the installation of the new operator is complete. In some examples, post installation actions can include performing clean-up of resources that are no longer used by the platform.

In some embodiments, the methods and workflows described in the present disclosure are performed during runtime of the containerized application. For example, a containerized application such as, for example, an airline ticket sales application, can remain operative to clients during the installation of the new operator.

Figure 4:
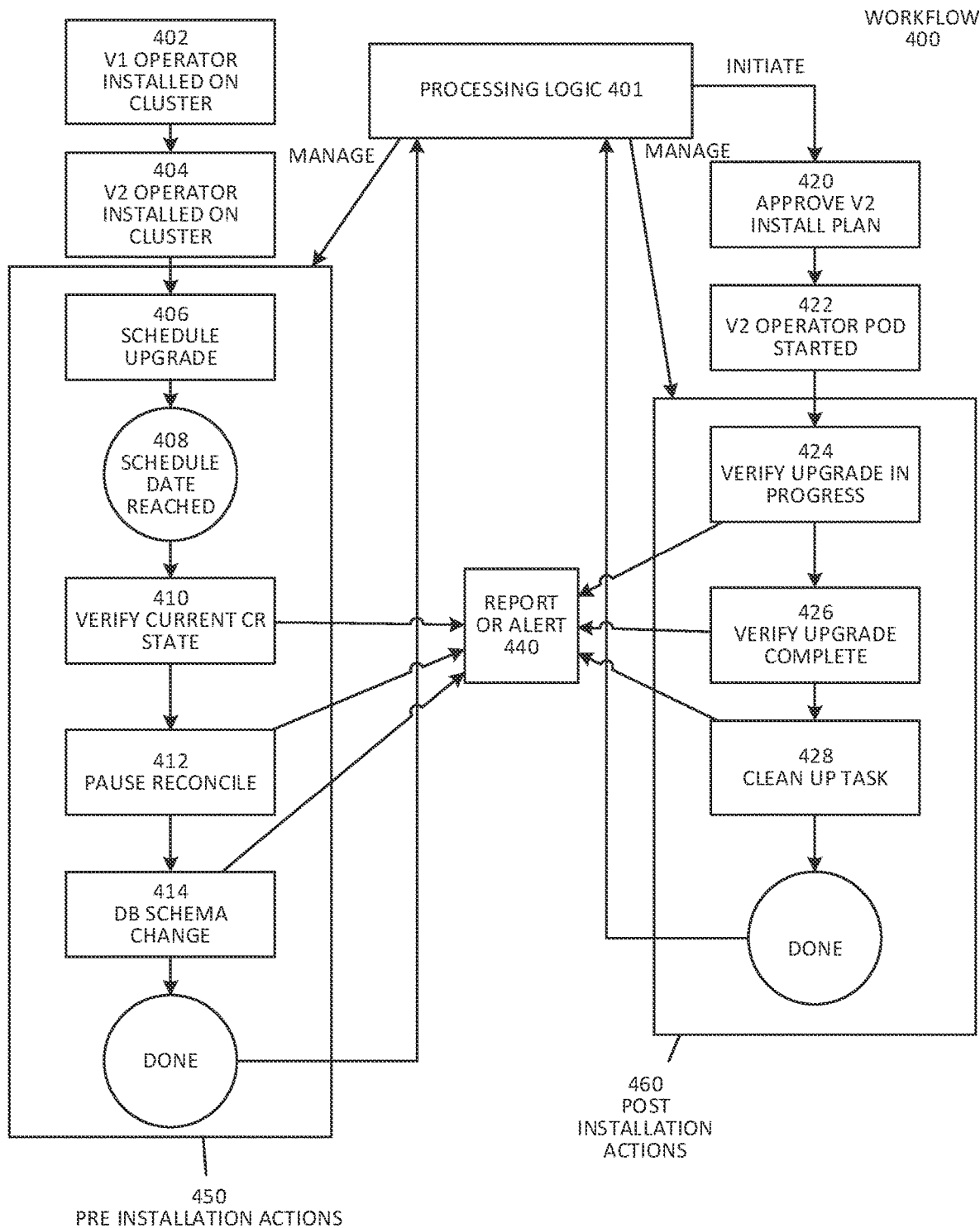
FIG. 4 shows an example workflow for installation management of an Operator with verifying a custom resource state, in accordance with some embodiments.

FIG. 4 shows an example workflow 400 for installation management of an operator, with verifying a custom resource state, in accordance with some embodiments. The workflow can be performed by a processing device such as processing device 102 that has an operator install component 103. Workflow 400 can be an example implementation of workflow 300.

At block 402, an operator with version 1 (e.g., an existing operator) is installed on a cluster of a platform for containerized applications. At block 404, an operator with version 2 (e.g., a new operator) is installed to the cluster, but not installed in the sense that the it is made active. The control loop of the version 2 operator is not yet up and running.

At block 406, processing logic 401 can schedule an upgrade. For example, processing logic 401 may write a date to a subscription, where the date (which can include a time) indicates when the installation is to occur. At block 408, in response to the scheduled date being reached, processing logic may proceed to block 410. At block 410, processing logic may verify a current state of one or more custom resources matches a desired predefined state. This state can be a version number or other state. If this action fails verification or times out, then processing logic can proceed to block 440 and generate a report or alert. Otherwise, processing logic may proceed to block 412.

At block 412, processing logic 401 may pause reconciliation of the version 2 operator. If this action fails or times out, processing logic may proceed to block 440 and generate a report or alert. Otherwise, processing logic may proceed to block 414.

At block 414, processing logic 401 may change a database schema. The database associated with the database schema can be a custom resource. The database may not compatible with the version 2 operator. Thus, processing logic may change the database schema to be compatible with the version 2 operator. The database schema may define a structure of the database (a blueprint of how the data is organized in the database), described in a formal language which is supported by a database management system. Thus, by altering the database schema, processing logic can change the structure of the database (e.g., removing or adding fields) to make the database compatible with the version 2 operator.

When processing logic 401 completes pre-installation actions 450 successfully, processing logic can initiate installation of the version 2 operator by approving an install plan for the version 2 operator, at block 420. This can trigger an OLM to remove the version 1 operator and bring up the version 2 operator.

Processing logic 401 may perform one or more post installation actions 460. For example, processing logic may proceed to block 424 to verify that the upgrade to the version 2 operator is in progress. This can be performed, for example, by getting metadata from a custom resource to check if an upgrade to version 2 is in progress. Similarly, at block 426, processing logic can get metadata from a custom resource to check if the version number has become version 2.

At block 428, processing logic can perform a clean-up. Such clean-up may be domain specific and may vary from one installation to another. Clean-up can include discarding components that are no longer needed. As described, any of the actions 424, 426, and 428 may fail verification or go beyond a time limit. In such a case, processing logic may proceed to block 440 and generate a report or alert.

FIG. 5 shows an example resource 500 having instructions for pre-installation actions, in accordance with some embodiments. Processing logic may obtain and parse this resource and perform one or more actions based on the fields in the resource. This resource 500 is one of a plurality of possible examples of a resource such as resource 110 described with respect to FIG. 1 and in other sections of the disclosure.

The resource 500 may contain an API version identifier field that indicates to processing logic what API version this resource is compatible with. The resource can include a field 'kind' that describes to processing logic what kind of resource it is, for example, an 'InstallManageVerify' resource.

The resource may include a field 501 which can include a setting for muting alerts. This setting 'muteAlerts' can be defined by a user as 'true' or 'false'. If set to true, processing logic can mute container alerts that may go out to SREs prior to the installation, so that an SRE is not unnecessarily alarmed during an Operator installation. A resource may be a file written in a particular format, for example, YAML, JSON, or other format.

Resource 500 may organize pre-installation and post-installation actions separately. For example, action fields 502, 504, 506 and 508 may be organized in the resource as pre-installation actions. Other action fields, such as those shown in FIG. 6, can be organized as post-installation actions. A user can set each field of the resource initially to configure the installation of the new Operator based on general or domain knowledge to reduce risk of incompatibilities and/or reduce unwanted downtime.

Each action, whether pre or post installation, can include a name, a namespace, a type, an action, a command, an assertion, and/or a time limit. The name of the action can indicate to processing logic what kind of action this field is associated with, for example, 'schedule-upgrade' shows that the action will be to schedule an upgrade. The namespace can indicate a virtual cluster within a cluster that the action is to be performed in. The type can indicate whether the action will be performing verification or a task without verification. The action and command can describe the action to be taken by processing logic, and a command that will be used by processing logic to perform the action. The time limit can indicate to processing logic how long a given action can take until processing logic deems it to have failed.

In response to field 502, processing logic can schedule an upgrade or install based on a specific date and time. For example, a date and time 2021-07-05 at 3:15:37 Zulu time is shown in the command sub-field to indicate when processing logic is to schedule the installation. Processing logic can set the date and time in a subscription resource such that, when the date and the time is met, processing logic can perform the remaining actions specified in the resource.

In response to field 504, processing logic can verify that a custom resource is in a desired state prior to the installation of the new operator. In this example, the desired state is specified version: 1. Processing logic can get metadata (which may be structured data) from the custom resource and parse it to determine if the state satisfies the desired state (e.g., version 1). If this condition is satisfied, processing logic can proceed to the next action. Otherwise, processing logic may halt the installation, as described.

In response to field 506, processing logic may pause reconciliation of the current operator, in preparation for the upgrade. As mentioned, each operator can have a controller that performs a control loop that repeatedly polls state of one or more custom resources and acts to move the custom resource to a desired state. The desired state can be defined in a custom resource definition that is defines that particular custom resource.

In response to field 508, processing logic may perform a database schema change. This database change may be performed to make the database compatible with the new operator, or with other reasons. The change to the database can be specified in the field in detail. For example, the field may specify (e.g., in a 'command' portion of the field) to add a column with name 'X' after an existing column named 'Y'.

Processing logic can monitor whether each of the pre-installation actions are performed successfully which can be indicated by the action being performed within a given time limit and/or with verification criteria being satisfied. In response to the pre-installation actions being performed successfully, processing logic can approve the installation of the new Operator. In some examples, processing logic can include approving an install plan that immediately triggers an OLM to replace an existing operator with the new operator.

Figure 6:
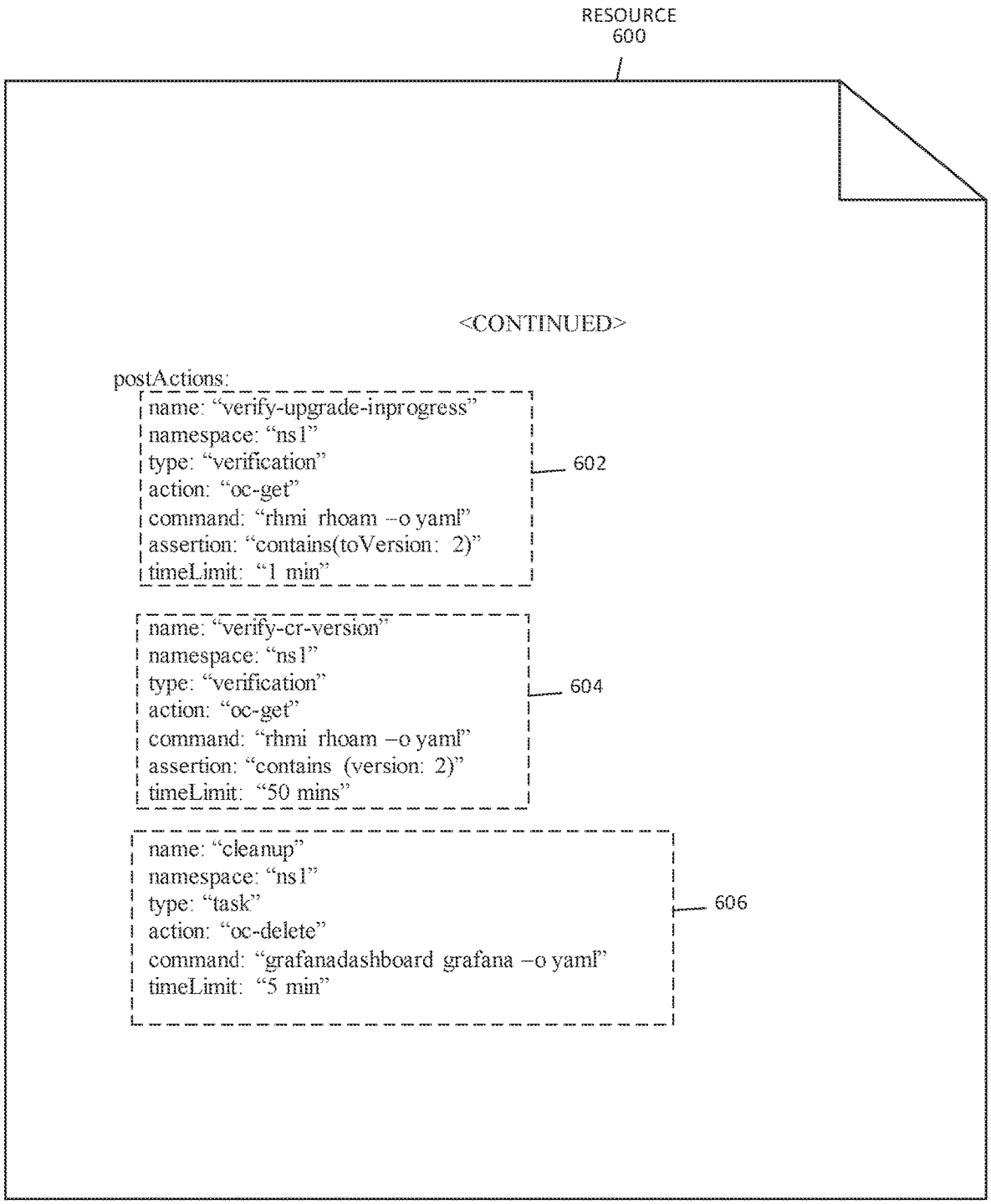
FIG. 6 shows an example resource having instructions for post-installation actions, in accordance with some embodiments.

FIG. 6 shows an example resource 600 having instructions for post-installation actions, in accordance with some embodiments. Example resource 600 may be a continuation of resource 500 shown in FIG. 5. Resource 600 may include post-installation fields 602, 604, and 606 which may be acted upon by processing logic. As mentioned, prior to performing the post-installation actions, processing logic may approve an installation of the new operator, which may cause the platform to initialize a pod associated with the new operator.

In response to field 602, processing logic may verify that the upgrade of one or more custom resources is in progress. For example, processing logic may get metadata associated with a custom resource and search the metadata to verify that a 'toVersion' field exists in the metadata. If so, then this indicates to processing logic that the upgrade of the custom resources and the installation of the new operator is underway.

In response to field 604, processing logic may verify that the upgrade of the custom resources is complete. For example, processing logic may get metadata associated with a custom resource and search the metadata to verify that the 'Version' of the custom resource is set to '2', where it was previously '1'.

In response to field 606, processing logic may perform a clean-up action to delete one or more resources no longer needed. These specified resources can be domain-specific and vary from one installation to another.

In some examples, resource 500 and resource 600 are a common resource. The common resource can contain both pre-installation actions, post-installation actions, and other fields described. Processing logic can parse the resource and implement the fields contained in the resource, as shown for example, in workflows 300 and 400. Workflow 400 is an example workflow that may result from implementing the resource shown in FIG. 5 and FIG. 6.

As such, processing logic can implement actions specified by resource 500 and resource 600 to reduce the risk of incompatibilities between a new operator and custom resources, and to place custom resources in known states prior to installation. Alerts can be shut off to reduce false alerts to SREs. Upgrade of operators can be performed in a controlled environment, where a user with domain knowledge can set fields in the resource (e.g., the IMV file). A single resource can be used to install multiple new operators.

Figure 7:
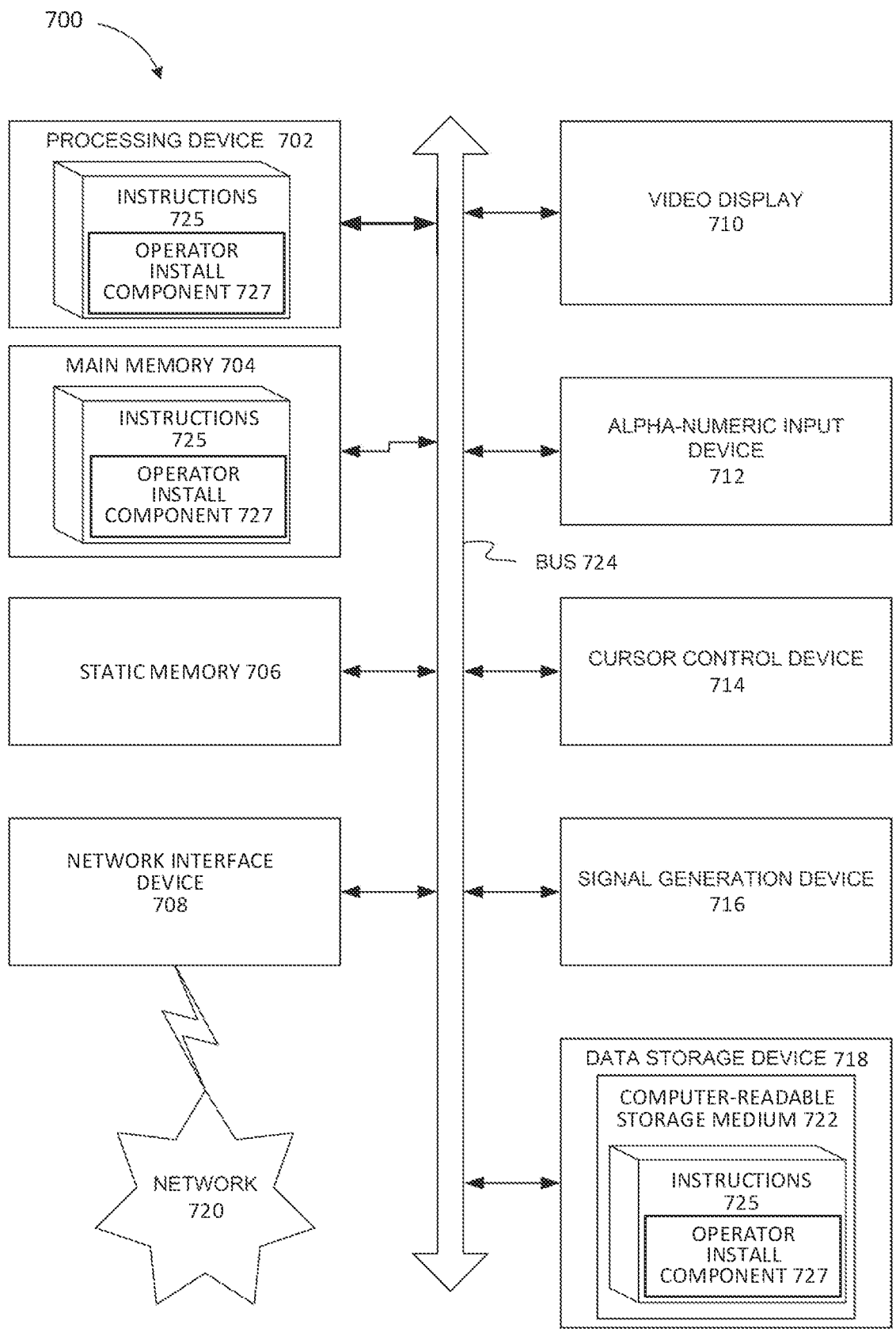
FIG. 7 is a block diagram illustrating a computing device for managing installation of an operator on a platform for a containerized application, in accordance with some embodiments.

FIG. 7 is a block diagram illustrating a computing device for managing installation of an operator on a platform for a containerized application, in accordance with some embodiments. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 518), which may communicate with each other via a bus 724.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a network 720. The computing device 500 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions 725 that may include instructions for a processing device (e.g., processing device 102), for carrying out the operations described herein, in accordance with one or more aspects of the present disclosure. Instructions 725 may also reside, completely or at least partially, within main memory 704 and/or within processing device 702 during execution thereof by computing device 700, main memory 704 and processing device 702 also constituting computer-readable media. The instructions 725 may further be transmitted or received over a network 720 via network interface device 708. The instructions 725 may contain instructions of an operator install component 727 that, when executed, perform the operations and steps discussed herein.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "sending", "storing", "obtaining", "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component may be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" may include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    obtaining, by a hardware processing device, a resource of a platform for a containerized application;
    in response to an indication being defined in the resource, scheduling, by the hardware processing device, an installation of a new operator of the platform to replace an existing operator that manages one or more custom resources of the platform;
    performing, by the hardware processing device, one or more pre-installation actions that are defined in the resource, prior to the installation of the new operator, including verifying, by the hardware processing device, that the one or more custom resources managed by the existing operator of the platform have a pre-defined current state, and in response to verifying that the one or more custom resources have the pre-defined current state, pausing the existing operator from performing reconciliation to maintain the pre-defined current state of the one or more custom resources; and
    approving, by the hardware processing device, the installation of the new operator in response to successful execution of the one or more pre-installation actions including successful verification that the one or more custom resources are maintained in the pre-defined current state when the installation of the new operator is perform, the approving of the installation causing a removal of the existing operator and the installation of the new operator when the existing operator is paused from performing reconciliation and when the one or more custom resources has the pre-defined current state.

2. The method of claim 1, wherein the pre-defined current state includes a desired version number of the one or more custom resources.

3. The method of claim 1, wherein performing the one or more pre-installation actions includes modifying, by the hardware processing device, a database of the one or more custom resources, such that the one or more custom resources is compatible with the new operator.

4. The method of claim 1, wherein in response to a failure to pause the existing operator, the hardware processing device generates a report or alert.

5. The method of claim 1, wherein the hardware processing device approves the installation of the new operator in response to successful execution of all the one or more pre-installation actions.

6. The method of claim 1, wherein approving the installation of the new operator includes approving, by the hardware processing device, an install plan that an Operator Lifecycle Manager (OLM) will respond to by removing the existing operator and installing the new operator.

7. The method of claim 6, wherein the installation of the new operator is not performed by the OLM unless the install plan is approved.

8. The method of claim 1, wherein the new operator and the existing operator each has a respective control loop that, during runtime, repeatedly obtains a current state from each of the one or more custom resources of the platform, and the respective control loop of each of the new operator and the existing operator performs actions to move each of the one or more custom resources to a desired state.

9. The method of claim 1, further comprising muting alerts, by the hardware processing device, based on instructions contained in the resource.

10. The method of claim 1, further comprising performing, by the hardware processing device, one or more post-installation actions that are defined in the resource, after initiation of the installation of the new operator.

11. The method of claim 10, wherein the one or more post-installation actions includes verifying that the installation of the new operator is in progress.

12. The method of claim 10, wherein the one or more post-installation actions includes verifying that the installation of the new operator is complete.

13. The method of claim 10, wherein the one or more post-installation actions includes performing, by the hardware processing device, clean-up of resources that are no longer used by the platform.

14. The method of claim 1, wherein the method is performed during runtime of the containerized application.

15. A system comprising:
a memory; and
a hardware processing device operatively coupled to the memory, the hardware processing device to:
obtain a resource of a platform for a containerized application;
in response to an indication being defined in the resource, schedule an installation of a new operator of the platform to replace an existing operator that manages one or more custom resources of the platform;
perform one or more pre-installation actions that are defined in the resource, prior to the installation of the new operator, including verifying, by the hardware processing device, that the one or more custom resources managed by the existing operator of the platform have a pre-defined current state, and in response to verifying that the one or more custom resources have the pre-defined current state, pause the existing operator from performing reconciliation to maintain the pre-defined current state of the one or more custom resources; and
approve the installation of the new operator in response to successful execution of the one or more pre-installation actions including successful verification that the one or more custom resources are maintained in the pre-defined current state when the installation of the new operator is performed, the approve of the installation causing a removal of the existing operator and the installation of the new operator when the existing operator is paused from performing reconciliation and when the one or more custom resources has the pre-defined current state.

16. The system of claim 15, wherein the pre-defined current state includes a desired version number of the one or more custom resources.

17. The system of claim 15, wherein to perform the one or more pre-installation actions includes to modify, by the hardware processing device, a database of the one or more custom resources, such that the one or more custom resources is compatible with the new operator.

18. A non-transitory computer-readable storage medium including instructions that, when executed by a hardware processing device, cause the hardware processing device to:
obtain a resource of a platform for a containerized application;
in response to an indication being defined in the resource, schedule an installation of a new operator of the platform to replace an existing operator that manages one or more custom resources of the platform;
perform one or more pre-installation actions that are defined in the resource, prior to the installation of the new operator, including verifying, by the hardware processing device, that the one or more custom resources managed by the existing operator of the platform have a pre-defined current state, and in response to verifying that the one or more custom resources have the pre-defined current state, pause the existing operator from performing reconciliation to maintain the pre-defined current state of the one or more custom resources; and
approve the installation of the new operator in response to successful execution of the one or more pre-installation actions including successful verification that the one or more custom resources are maintained in the pre-defined current state when the installation of the new operator is performed, the approve of the installation causing a removal of the existing operator and the installation of the new operator when the existing operator is paused from performing reconciliation and when the one more custom resources has the pre-defined current state.

19. The non-transitory computer-readable storage medium of claim 18, wherein the pre-defined current state includes a desired version number of the one or more custom resources.

20. The non-transitory computer-readable storage medium of claim 18, wherein to perform the one or more pre-installation actions includes to modify, by the hardware processing device, a database of the one or more custom resources, such that the one or more custom resources is compatible with the new operator.

* * * * *

UNITED STATES PATENT AND TRADEMARK OFFICE
CERTIFICATE OF CORRECTION

PATENT NO. : 11,989,542 B2
APPLICATION NO. : 17/518902
DATED : May 21, 2024
INVENTOR(S) : Cathal O'Connor et al.

It is certified that error appears in the above-identified patent and that said Letters Patent is hereby corrected as shown below:

In the Specification

In Column 3, Line 1, please replace "to try keep" with -- to try to keep --.

In Column 3, Line 12, please replace "The Operator can functionality that enforces" with -- The Operator can have functionality that enforces --.

In Column 4, Line 53, please replace "can be file" with -- can be filed --.

In Column 5, Line 8, please replace "can install of a new operator" with -- can install a new operator --.

In Column 9, Line 64, please replace "that is defines that particular" with -- that defines that particular --.

In the Claims

In Column 14, Line 12, please replace "is perform," with -- is performed, --.

Signed and Sealed this
Sixth Day of May, 2025

Coke Morgan Stewart
*Acting Director of the United States Patent and Trademark Office*